US010808322B2

(12) United States Patent
Whitaker et al.

(10) Patent No.: US 10,808,322 B2
(45) Date of Patent: Oct. 20, 2020

(54) ELECTRODEPOSITED COMPOSITIONS AND NANOLAMINATED ALLOYS FOR ARTICLES PREPARED BY ADDITIVE MANUFACTURING PROCESSES

(71) Applicant: Modumetal, Inc., Seattle, WA (US)

(72) Inventors: John D. Whitaker, Seattle, WA (US); Christina A. Lomasney, Seattle, WA (US); Richard J. Caldwell, Lynnwood, WA (US); William Krupps, Seattle, WA (US); Jesse Unger, La Jolla, CA (US)

(73) Assignee: MODUMETAL, INC., Seattle, WA (US)

( * ) Notice: Subject to any disclaimer, the term of this patent is extended or adjusted under 35 U.S.C. 154(b) by 374 days.

(21) Appl. No.: 14/855,192

(22) Filed: Sep. 15, 2015

(65) Prior Publication Data

US 2016/0002790 A1 Jan. 7, 2016

Related U.S. Application Data

(63) Continuation of application No. PCT/US2014/030592, filed on Mar. 17, 2014.

(60) Provisional application No. 61/798,559, filed on Mar. 15, 2013.

(51) Int. Cl.
| | |
|---|---|
| *C25D 5/14* | (2006.01) |
| *C23C 18/16* | (2006.01) |
| *C25D 5/12* | (2006.01) |
| *C25D 5/18* | (2006.01) |
| *B82Y 40/00* | (2011.01) |
| *C23F 17/00* | (2006.01) |
| *B82Y 30/00* | (2011.01) |
| *B33Y 10/00* | (2015.01) |

(52) U.S. Cl.
CPC .......... *C23C 18/1653* (2013.01); *B82Y 40/00* (2013.01); *C23C 18/1689* (2013.01); *C23F 17/00* (2013.01); *C25D 5/12* (2013.01); *C25D 5/18* (2013.01); *B33Y 10/00* (2014.12); *B82Y 30/00* (2013.01); *C25D 5/14* (2013.01)

(58) Field of Classification Search
CPC .... C25D 5/12; C25D 5/14; C25D 5/18; C23C 18/1653; C23C 18/1651; C23C 18/1689
See application file for complete search history.

(56) References Cited

U.S. PATENT DOCUMENTS

| | | | |
|---|---|---|---|
| 2,428,033 A | 9/1947 | Nachtman | |
| 2,436,316 A | 2/1948 | Lum et al. | |
| 2,470,775 A | 5/1949 | Jernstedt et al. | |
| 2,558,090 A | 6/1951 | Jernstedt | |
| 2,642,654 A | 6/1953 | Ahrens | |
| 2,678,909 A | 5/1954 | Jernstedt et al. | |
| 2,694,743 A | 11/1954 | Ruskin et al. | |
| 2,706,170 A | 4/1955 | Marchese | |
| 2,891,309 A | 6/1959 | Fenster | |
| 3,090,733 A | 5/1963 | Brown | |
| 3,255,781 A | 6/1966 | Gillespie, Jr. | |
| 3,282,810 A | 11/1966 | Odekerken | |
| 3,359,469 A | 12/1967 | Levy et al. | |
| 3,362,851 A | 1/1968 | Dunster | |
| 3,483,113 A | 12/1969 | Carter | |
| 3,549,505 A | 12/1970 | Hanusa | |
| 3,616,286 A | 10/1971 | Aylward et al. | |
| 3,633,520 A | 1/1972 | Stiglich, Jr. | |
| 3,716,464 A | 2/1973 | Kovac et al. | |
| 3,753,664 A | 8/1973 | Klingenmaier et al. | |
| 3,759,799 A | 9/1973 | Reinke | |
| 3,787,244 A | 1/1974 | Schulmeister et al. | |
| 3,866,289 A | 2/1975 | Brown et al. | |
| 3,994,694 A | 11/1976 | Clauss et al. | |
| 3,996,114 A | 12/1976 | Ehrsam | |
| 4,053,371 A | 10/1977 | Towsley | |
| 4,105,526 A | 8/1978 | Lewellen, Jr. et al. | |
| 4,107,003 A | 8/1978 | Anselrode | |
| 4,191,617 A * | 3/1980 | Hurley .................... | C25D 5/10 |
| | | | 205/176 |
| 4,204,918 A | 5/1980 | McIntyre et al. | |
| 4,216,272 A | 8/1980 | Clauss | |
| 4,246,057 A | 1/1981 | Janowski et al. | |
| 4,284,688 A | 8/1981 | Stücheli et al. | |
| 4,314,893 A | 2/1982 | Clauss | |
| 4,405,427 A | 9/1983 | Byrd | |
| 4,422,907 A | 12/1983 | Birkmaier et al. | |
| 4,461,680 A | 7/1984 | Lashmore | |
| 4,464,232 A | 8/1984 | Wakano et al. | |
| 4,510,209 A | 4/1985 | Hada et al. | |
| 4,519,878 A | 5/1985 | Hara et al. | |
| 4,540,472 A | 9/1985 | Johnson et al. | |
| 4,543,300 A | 9/1985 | Hara et al. | |
| 4,543,803 A | 10/1985 | Keyasko | |
| 4,591,418 A | 5/1986 | Snyder | |
| 4,592,808 A | 6/1986 | Doubt | |
| 4,597,836 A | 7/1986 | Schaer et al. | |
| 4,613,388 A * | 9/1986 | Walter ................... | C25D 3/562 |
| | | | 148/425 |
| 4,620,661 A | 11/1986 | Slatterly | |
| 4,652,348 A | 3/1987 | Yahalom et al. | |
| 4,666,567 A | 5/1987 | Loch | |
| 4,670,356 A * | 6/1987 | Sato ...................... | G11B 5/851 |
| | | | 204/192.2 |
| 4,678,552 A | 7/1987 | Chen | |
| 4,678,721 A | 7/1987 | den Broeder et al. | |
| 4,702,802 A | 10/1987 | Umino et al. | |
| H543 H | 11/1988 | Chen et al. | |

(Continued)

FOREIGN PATENT DOCUMENTS

| | | |
|---|---|---|
| CN | 1380446 A | 11/2002 |
| CN | 1924110 A | 3/2007 |

(Continued)

OTHER PUBLICATIONS

"Improved Single Crystal Superalloys"; Superalloys, 2004, p. 45. (Year: 2004).*

(Continued)

*Primary Examiner* — Margaret G Moore
(74) *Attorney, Agent, or Firm* — Seed Intellectual Property Law Group LLP

(57) ABSTRACT

Articles prepared by additive manufacturing of preforms that are coated by electrodeposition of nanolaminate materials, and methods of their production are described.

29 Claims, No Drawings

(56) References Cited

U.S. PATENT DOCUMENTS

| | | | |
|---|---|---|---|
| 4,795,735 A | 1/1989 | Liu et al. | |
| 4,834,845 A | 5/1989 | Muko et al. | |
| 4,839,214 A | 6/1989 | Oda et al. | |
| 4,869,971 A | 9/1989 | Nee et al. | |
| 4,885,215 A | 12/1989 | Yoshioka et al. | |
| 4,904,542 A | 2/1990 | Mroczkowski | |
| 4,904,543 A | 2/1990 | Sakakima et al. | |
| 4,923,574 A | 5/1990 | Cohen | |
| 4,975,337 A | 12/1990 | Hyner et al. | |
| 5,043,230 A | 8/1991 | Jagannathan et al. | |
| 5,045,356 A | 9/1991 | Uemura et al. | |
| 5,056,936 A | 10/1991 | Mahrus et al. | |
| 5,059,493 A | 10/1991 | Takahata | |
| 5,073,237 A | 12/1991 | Bacher et al. | |
| 5,079,039 A | 1/1992 | Heraud et al. | |
| 5,156,729 A | 10/1992 | Mahrus et al. | |
| 5,156,899 A | 10/1992 | Kistrup et al. | |
| 5,158,653 A | 10/1992 | Lashmore et al. | |
| 5,190,637 A | 3/1993 | Guckel | |
| 5,228,967 A | 7/1993 | Crites et al. | |
| 5,268,235 A * | 12/1993 | Lashmore | C25D 5/10 205/170 |
| 5,300,165 A | 4/1994 | Sugikawa | |
| 5,320,719 A | 6/1994 | Lasbmore et al. | |
| 5,326,454 A | 7/1994 | Engelhaupt | |
| 5,352,266 A | 10/1994 | Erb et al. | |
| 5,378,583 A | 1/1995 | Guckel et al. | |
| 5,413,874 A | 5/1995 | Moysan, III et al. | |
| 5,431,800 A | 7/1995 | Kirchhoff et al. | |
| 5,461,769 A | 10/1995 | McGregor | |
| 5,472,795 A | 12/1995 | Atita | |
| 5,489,488 A | 2/1996 | Asai et al. | |
| 5,500,600 A * | 3/1996 | Moyes | G01R 29/0835 324/639 |
| 5,547,096 A | 4/1996 | Kleyn | |
| 5,527,445 A | 6/1996 | Palumbo | |
| 5,545,435 A | 8/1996 | Steffier | |
| 5,620,800 A | 4/1997 | De Leeuw et al. | |
| 5,660,704 A | 8/1997 | Murase | |
| 5,679,232 A | 10/1997 | Fedor et al. | |
| 5,738,951 A | 4/1998 | Goujard et al. | |
| 5,742,471 A | 4/1998 | Barbee, Jr. et al. | |
| 5,783,259 A | 7/1998 | McDonald | |
| 5,798,033 A | 8/1998 | Uemiya et al. | |
| 5,800,930 A | 9/1998 | Chen et al. | |
| 5,828,526 A * | 10/1998 | Kagawa | B82Y 10/00 360/324 |
| 5,912,069 A | 6/1999 | Yializis et al. | |
| 5,930,085 A * | 7/1999 | Kitade | B82Y 10/00 360/324.11 |
| 5,942,096 A | 8/1999 | Ruzicka et al. | |
| 6,036,832 A | 3/2000 | Knol et al. | |
| 6,071,398 A | 6/2000 | Martin et al. | |
| 6,143,424 A | 11/2000 | Jonte et al. | |
| 6,143,430 A | 11/2000 | Miyasaka et al. | |
| 6,193,858 B1 | 2/2001 | Hradil et al. | |
| 6,203,936 B1 | 3/2001 | Cisar et al. | |
| 6,212,078 B1 | 4/2001 | Hunt et al. | |
| 6,214,473 B1 | 4/2001 | Hunt et al. | |
| 6,284,357 B1 | 9/2001 | Lackey et al. | |
| 6,312,579 B1 | 11/2001 | Bank et al. | |
| 6,344,123 B1 | 2/2002 | Bhatnagar | |
| 6,355,153 B1 | 3/2002 | Uzoh et al. | |
| 6,409,907 B1 | 6/2002 | Braun et al. | |
| 6,415,942 B1 | 7/2002 | Fenton et al. | |
| 6,461,678 B1 | 10/2002 | Chen et al. | |
| 6,466,417 B1 * | 10/2002 | Gill | B82Y 10/00 360/324.12 |
| 6,468,672 B1 | 10/2002 | Donovan, III et al. | |
| 6,537,683 B1 | 3/2003 | Staschko et al. | |
| 6,547,944 B2 | 4/2003 | Schreiber et al. | |
| 6,592,739 B1 | 7/2003 | Sonoda et al. | |
| 6,739,028 B2 | 5/2004 | Sievenpiper et al. | |
| 6,800,121 B2 | 10/2004 | Shahin | |
| 6,884,499 B2 | 4/2005 | Penich et al. | |
| 6,902,827 B2 * | 6/2005 | Kelly | C23C 28/023 205/104 |
| 6,908,667 B2 | 6/2005 | Christ et al. | |
| 6,979,490 B2 | 12/2005 | Steffier | |
| 7,581,933 B2 * | 9/2009 | Bruce | C23C 30/00 415/217.1 |
| 7,736,753 B2 * | 6/2010 | Deligianni | B82Y 25/00 428/402 |
| 8,152,985 B2 | 4/2012 | Macary | |
| 8,253,035 B2 | 8/2012 | Matsumoto | |
| 8,585,875 B2 | 11/2013 | Cummings et al. | |
| 8,814,437 B2 | 8/2014 | Braun | |
| 9,005,420 B2 | 4/2015 | Tomantschger et al. | |
| 9,080,692 B2 | 7/2015 | Tomomori et al. | |
| 9,108,506 B2 | 8/2015 | Whitaker et al. | |
| 9,115,439 B2 | 8/2015 | Whitaker | |
| 9,234,294 B2 | 1/2016 | Whitaker et al. | |
| 9,273,932 B2 | 3/2016 | Whitaker et al. | |
| 9,732,433 B2 | 8/2017 | Caldwell et al. | |
| 9,758,891 B2 | 9/2017 | Bao | |
| 9,938,629 B2 | 4/2018 | Whitaker et al. | |
| 10,253,419 B2 * | 4/2019 | Lomasney | C25D 5/10 |
| 10,266,957 B2 | 4/2019 | Sugawara et al. | |
| 10,472,727 B2 | 11/2019 | Lomasney | |
| 10,513,791 B2 | 12/2019 | Lomasney et al. | |
| 10,544,510 B2 | 1/2020 | Lomasney | |
| 10,662,542 B2 | 5/2020 | Caldwell et al. | |
| 2001/0037944 A1 | 11/2001 | Sanada et al. | |
| 2002/0100858 A1 | 8/2002 | Weber | |
| 2002/0179449 A1 | 12/2002 | Domeier et al. | |
| 2003/0134142 A1 | 7/2003 | Ivey et al. | |
| 2003/0234181 A1 | 12/2003 | Palumbo | |
| 2003/0236163 A1 | 12/2003 | Chaturvedi et al. | |
| 2004/0027715 A1 | 2/2004 | Hixson-Goldsmith et al. | |
| 2004/0031691 A1 | 2/2004 | Kelly et al. | |
| 2004/0067314 A1 | 4/2004 | Joshi et al. | |
| 2004/0154925 A1 | 8/2004 | Podlaha et al. | |
| 2004/0178076 A1 | 9/2004 | Stonas et al. | |
| 2004/0211672 A1 | 10/2004 | Ishigami et al. | |
| 2004/0239836 A1 | 12/2004 | Chase | |
| 2005/0002228 A1 * | 1/2005 | Dieny | B82Y 25/00 365/171 |
| 2005/0109433 A1 | 5/2005 | Danger et al. | |
| 2005/0205425 A1 | 9/2005 | Palumbo et al. | |
| 2005/0221100 A1 | 10/2005 | Kirihara et al. | |
| 2005/0279640 A1 | 12/2005 | Shimoyama et al. | |
| 2006/0135281 A1 | 6/2006 | Palumbo et al. | |
| 2006/0135282 A1 | 6/2006 | Palumbo et al. | |
| 2006/0201817 A1 | 9/2006 | Guggemos et al. | |
| 2006/0243597 A1 | 11/2006 | Matefi-Tempfli et al. | |
| 2006/0269770 A1 * | 11/2006 | Cox | C23C 28/023 428/553 |
| 2006/0272949 A1 | 12/2006 | Detor et al. | |
| 2006/0286348 A1 | 12/2006 | Sauer | |
| 2007/0158204 A1 | 7/2007 | Taylor et al. | |
| 2007/0269648 A1 | 11/2007 | Schuh et al. | |
| 2007/0278105 A1 | 12/2007 | Ettel | |
| 2008/0093221 A1 | 4/2008 | Basol | |
| 2008/0102360 A1 | 5/2008 | Stimits et al. | |
| 2008/0226976 A1 | 9/2008 | Stimits | |
| 2008/0245669 A1 | 10/2008 | Yoshioka et al. | |
| 2008/0271995 A1 | 11/2008 | Savastiouk et al. | |
| 2009/0004465 A1 | 1/2009 | Kano et al. | |
| 2009/0101511 A1 | 4/2009 | Lochtman et al. | |
| 2009/0130424 A1 | 5/2009 | Tholen et al. | |
| 2009/0130425 A1 | 5/2009 | Whitaker | |
| 2009/0130479 A1 | 5/2009 | Detor et al. | |
| 2009/0155617 A1 | 6/2009 | Kim et al. | |
| 2009/0159451 A1 * | 6/2009 | Tomantschger | C25D 1/00 205/96 |
| 2009/0283410 A1 | 11/2009 | Sklar et al. | |
| 2010/0187117 A1 | 7/2010 | Lingenfelter et al. | |
| 2010/0304063 A1 * | 12/2010 | McCrea | C08J 7/04 428/35.8 |
| 2010/0304179 A1 | 12/2010 | Facchini et al. | |
| 2010/0319757 A1 | 12/2010 | Oetting | |
| 2011/0162970 A1 | 7/2011 | Sato | |
| 2011/0180413 A1 | 7/2011 | Whitaker et al. | |

(56) References Cited

U.S. PATENT DOCUMENTS

| | | | |
|---|---|---|---|
| 2011/0186582 A1 | 8/2011 | Whitaker et al. | |
| 2011/0256356 A1* | 10/2011 | Tomantschger | C25D 1/00 428/172 |
| 2011/0277313 A1* | 11/2011 | Soracco | A63B 53/04 29/592 |
| 2012/0088118 A1* | 4/2012 | Lomasney | C25D 5/10 428/615 |
| 2012/0118745 A1* | 5/2012 | Bao | C25D 17/10 205/50 |
| 2012/0135270 A1* | 5/2012 | Wilbuer | C23C 2/02 428/646 |
| 2012/0231574 A1 | 9/2012 | Wang | |
| 2012/0282417 A1 | 11/2012 | Garcia et al. | |
| 2013/0052343 A1* | 2/2013 | Dieny | B22F 9/00 427/212 |
| 2013/0071755 A1 | 3/2013 | Oguro | |
| 2013/0075264 A1 | 3/2013 | Cummings et al. | |
| 2013/0130057 A1 | 5/2013 | Caldwell et al. | |
| 2013/0186852 A1 | 7/2013 | Dietrich et al. | |
| 2013/0220831 A1 | 8/2013 | Vidaurre Heiremans et al. | |
| 2013/0224008 A1 | 8/2013 | Cheung et al. | |
| 2013/0323473 A1 | 12/2013 | Dietsch et al. | |
| 2014/0163717 A1* | 6/2014 | Das | B22F 3/1055 700/119 |
| 2014/0231266 A1 | 8/2014 | Sherrer et al. | |
| 2015/0315716 A1 | 11/2015 | Whitaker | |
| 2015/0322588 A1 | 11/2015 | Lomasney et al. | |
| 2016/0002803 A1 | 1/2016 | Sklar | |
| 2016/0002806 A1 | 1/2016 | Lomasney | |
| 2016/0002813 A1 | 1/2016 | Lomasney | |
| 2016/0024663 A1 | 1/2016 | Lomasney | |
| 2016/0145850 A1 | 5/2016 | Cook et al. | |
| 2016/0159488 A1 | 6/2016 | Roach et al. | |
| 2016/0160863 A1 | 6/2016 | Roach et al. | |
| 2017/0191177 A1 | 7/2017 | Whitaker et al. | |
| 2017/0191179 A1 | 7/2017 | Sklar | |
| 2018/0016692 A1 | 1/2018 | Caldwell et al. | |
| 2018/0016694 A1* | 1/2018 | Bao | C25D 5/16 |
| 2018/0066375 A1 | 3/2018 | Morgan et al. | |
| 2018/0071980 A1 | 3/2018 | Lomasney et al. | |
| 2018/0245229 A1* | 8/2018 | Whitaker | C25D 5/16 |
| 2019/0309430 A1 | 10/2019 | Sklar | |
| 2019/0360116 A1 | 11/2019 | Collinson et al. | |
| 2020/0115998 A1 | 4/2020 | Lomasney | |
| 2020/0131658 A1 | 4/2020 | Lomasney et al. | |
| 2020/0173032 A1 | 6/2020 | Lomasney | |

FOREIGN PATENT DOCUMENTS

| | | |
|---|---|---|
| CN | 101113527 A | 1/2008 |
| CN | 101195924 A | 6/2008 |
| CN | 102148339 A | 8/2011 |
| DE | 39 02 057 A1 | 7/1990 |
| DE | 10 2004 006 441 A1 | 12/2005 |
| DE | 10 2010 011 087 A1 | 9/2011 |
| EP | 0 680 523 B1 | 2/2000 |
| EP | 1 498 976 A3 | 10/2006 |
| EP | 2 078 607 A1 | 7/2009 |
| EP | 3 128 045 A1 | 2/2017 |
| GB | 2 324 813 A | 11/1998 |
| JP | S47-2005 A | 2/1972 |
| JP | S47-33925 A | 11/1972 |
| JP | S52-109439 A | 9/1977 |
| JP | 58-197292 A | 11/1983 |
| JP | S60-97774 A | 5/1985 |
| JP | S61-99692 A | 5/1986 |
| JP | H01-132793 A | 5/1989 |
| JP | H 05251849 | 9/1993 |
| JP | H05251849 A | 9/1993 |
| JP | H06-196324 A | 7/1994 |
| JP | 07-065347 * | 3/1995 |
| JP | 07-065347 A | 3/1995 |
| JP | 2000-239888 A | 9/2000 |
| JP | 2001-181893 A | 7/2001 |
| JP | 2006-215590 A | 9/2009 |
| JP | 2009-215590 A | 9/2009 |
| KR | 10-2015-0132043 A | 11/2015 |
| SU | 36121 A1 | 4/1934 |
| WO | 83/02784 A1 | 8/1983 |
| WO | 95/14116 | 5/1995 |
| WO | 97/00980 A1 | 1/1997 |
| WO | 02/33150 A2 | 4/2002 |
| WO | 03/100484 A2 | 12/2003 |
| WO | 2004/001100 A1 | 12/2003 |
| WO | 2004/092436 A2 | 10/2004 |
| WO | 2007/045466 A1 | 4/2007 |
| WO | 2007/136387 A1 | 11/2007 |
| WO | 2007/138619 A1 | 12/2007 |
| WO | 2009/045433 A1 | 4/2009 |
| WO | 2010/139054 A1 | 12/2010 |
| WO | 2010/144509 A2 | 12/2010 |
| WO | 2011/033775 A1 | 3/2011 |
| WO | 2012/012789 A1 | 1/2012 |
| WO | 2012/145750 A2 | 10/2012 |
| WO | WO 2012/145750 A2 | 10/2012 |
| WO | 2013/010108 A1 | 1/2013 |
| WO | 2013/133762 A1 | 9/2013 |

OTHER PUBLICATIONS

English language translation JP 07-065347 (Mar. 1995).*
Onoda et al., "Preparation of amorphous/crystalloid soft magnetic multilayer Ni—Co—B alloy films by electrodeposition," *Journal of Magnetism and Magnetic Materials*, 126 (1993) 595-598.
International Search Report and Written Opinion, International Application No. PCT/US2014/030592 (published as WO 2014/145771) (dated Aug. 11, 2014).
Saleh et al., "Effects of electroplating on the mechanical properties of stereolithography and laser sintered parts," Rapid Prototyping Journal, vol. 10, No. 5, 2004, pp. 305-315.
Shishkovski, "Laser synthesis of functionally graded meso structures and bulk products," Moscow, FIZMATLIT, 2009, pp. 30-38, 43-47.
Leith et al., "Characterization of Flow-Induced Compositional Structure in Electrodeposited NiFe Composition-Modulated Alloys" *Journal of the Electrochemical Society*, 145(8): 1998, 2827-2833.
"Appendix 1: Literature review (Task 1): Literature review concerning the improvement of galvanneal (GA) coating adherence during shear test of adhesively bonded GA steel sheets," 70 pages, no date.
"Low-temperature iron plating," web blog article found at http:blog.sina.com.cn/s/blog_48ed0a9c01100024z.html, published Mar. 22, 2006, 3 pages. (with English translation).
Adams et al., "Controlling strength and toughness of multilayer films: A new multiscalar approach," *J. Appl. Phys.* 74(2):1015-1021, 1993.
Aizenberg et al., "Skeleton of *Euplectella* sp.: Structural Hierarchy from the Nanoscale to the Macroscale," *Science* 309:275-278, 2005.
Alfantazi et al., "Synthesis of nanocrystalline Zn—Ni alloy coatings," *JMSLD5* 15(15):1361-1363, 1996.
Atanassov et al., "Electrodeposition and properties of nickel-manganese layers," *Surface and Coatings Technology* 78:144-149, 1996.
Bakonyi et al., "Electrodeposited multilayer films with giant magnetoresistance (GMR): Progress and problems," *Progress in Materials Science* 55:107-245, 2010.
Bartlett et al., "Electrochemical deposition of macroporous platinum, palladium and cobalt films using polystyrene latex sphere templates," *Chem. Commun.*, pp. 1671-1672, 2000.
Beattie et al., "Comparison of Electrodeposited Copper-Zinc Alloys Prepared Individually and Combinatorially," *J. Electrochem. Soc.* 150(11):C802-C806, 2003.
Bird et al., "Giant Magnetoresistance in Electrodeposited Ni/Cu and Co/Cu Multilayers," *J. Electrochem. Soc.* 142(4):L65-L66, 1995.
Blum, "The Structure and Properties of Alternately Electrodeposited Metals," presented at the Fortieth General Meeting of the American Electrochemical Society, Lake Placid, New York, Oct. 1, 1921, 14 pages.

(56) References Cited

OTHER PUBLICATIONS

Cohen et al., "Electroplating of Cyclic Multilayered Alloy (CMA) Coatings," *J. Electrochem. Soc.* 130(10):1987-1995, 1983.
Cowles, "High cycle fatigue in aircraft gas turbines—an industry perspective," *International Journal of Fracture* 80(2-3):147-163, 1996.
"Designing with Metals: Dissimilar Metals and the Galvanic Series," printed Oct. 5, 2017, 3 pages.
Despic et al., "Electrochemical Formation of Laminar Deposits of Controlled Structure and Composition," *J. Electrochem. Soc.* 136(6):1651-1657, 1989.
Dini et al. "On the High Temperature Ductility Properties of Electrodeposited Sulfamate Nickel," *Plating and Surface Finishing* 65(2):36-40, 1978.
Etminanfar et al., "Corrosion resistance of multilayer coatings of nanolayered Cr/Ni electrodeposited from Cr(III)—Ni(II) bath," *Thin Solid Films* 520:5322-5327, 2012.
Gasser et al., "Materials Design for Acoustic Liners: an Example of Tailored Multifunctional Materials," *Advanced Engineering Materials* 6(1-2):97-102, 2004.
Georgescu et al., "Magnetic Behavior of [Ni/Co—Ni—Mg—N] x n Cylindrical Multilayers prepared by Magnetoelectrolysis," *Phys. Stat. Sol.* (a) 189(3):1051-1055, 2002.
Ghanem et al., "A double templated electrodeposition method for the fabrication of arrays of metal nanodots," *Electrochemistry Communications* 6:447-453, 2004.
Grimmett et al., "Pulsed Electrodeposition of Iron-Nickel Alloys," *J. Electrochem. Soc.* 137(11):3414-3418, 1990.
Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.
Huang et al., "Hardness variation and annealing behavior of a Cr—Ni multilayer electroplated in a trivalent chromium-based bath," *Surface and Coatings Technology* 203:3320-3324, 2009.
Huang et al., "Characterization of Cr—Ni multilayers electroplated from a chromium(III)-nickel(II) bath using pulse current," *Scripta Materialia*, 57:61-64, 2007.
Igawa et al., "Fabrication of SiC fiber reinforced SiC composite by chemical vapor infiltration for excellent mechanical properties," *Journal of Physics and Chemistry of Solids* 66:551-554, 2005.
Ivanov et al., "Corrosion resistance of compositionally modulated multilayered Zn—Ni alloys deposited from a single bath," *Journal of Applied Electrochemistry* 33:239-244, 2003.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.
Kalu et al., "Cyclic voltammetric studies of the effects of time and temperature on the capacitance of electrochemically deposited nickel hydroxide," *Journal of Power Sources* 92:163-167, 2001.
Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.
Karimpoor et al., "Tensile Properties of Bulk Nanocrystalline Hexagonal Cobalt Electrodeposits", *Materials Science Forum* 386-388:415-420, 2002.
Keckes et al., "Cell-wall recovery after irreversible deformation of wood," *Nature Materials* 2:810-814, 2003.
Kirilova et al., "Corrosion behaviour of Zn—Co compositionally modulated multilayers electrodeposited from single and dual baths," *Journal of Applied Electrochemistry* 29:1133-1137, 1999.
Kockar et al., "Effect of potantiostatic waveforms on properties of electrodeposited NiFe alloy films," *Eur. Phys. J. B*(42):497-501, 2004.
Lashmore et al., "Electrodeposited Cu—Ni Textured Superlattices," *J. Electrochem. Soc.* 135(5):1218-1221, 1988.
Lashmore et al., "Electrodeposited Multilayer Metallic Coatings", *Encyclopedia of Materials Science and Engineering*, Supp. vol. 1:136-140, 1988.
Leisner et al., "Methods for electrodepositing composition-modulated alloys," *Journal of Materials Processing Technology* 58:39-44, 1996.
Lekka et al., "Corrosion and wear resistant electrodeposited composite coatings," *Electrochimica Acta* 50:4551-4556, 2005.
Lewis et al., "Stability in thin film multilayers and microlaminates: the role of free energy, structure, and orientation at interfaces and grain boundaries," *Scripta Materialia* 48:1079-1085, 2003.
Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Meng et al., "Fractography, elastic modulus, and oxidation resistance of Novel metal-intermetallic $Ni/Ni_3Al$ multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A* 29A:1145-1155, 1998.
Nicholls, "Advances in Coating Design for High-Performance Gas Turbines," *MRS Bulletin*, p. 659-670, 2003.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.
Pilone et al., "Model of Multiple Metal Electrodeposition in Porous Electrodes," *Journal of the Electrochemical Society* 153(5):D85-D90, 2006.
Podlaha et al. "Induced Codeposition: I. An Experimental Investigation of Ni—Mo Alloys," *J. Electrochem. Soc.* 143(3):885-892, 1996.
Ross, "Electrodeposited Multilayer Thin Films," *Annual Review of Materials Science* 24:159-188, 1994.
Rousseau et al., "Single-bath Electrodeposition of Chromium-Nickel Compositionally Modulated Multilayers (CMM) From a Trivalent Chromium Bath," *Plating and Surface Finishing*, p. 106-110, 1999.
Sanders et al., "Mechanics of hollow sphere foams,"*Materials Science and Engineering* A347:70-85, 2003.
Sartwell et al., "Replacement of Chromium Electroplating on Gas Turbine Engine Components Using Thermal Spray Coatings," Report No. NPL/MR/6170-05-8890, Naval Research Laboratory, 2005. (207 pages).
Schwartz, "Multiple-Layer Alloy Plating", *ASM Handbook 5: Surface Engineering*, p. 274-276, 1994.
Sherik, "Synthesis, Structure and Properties of Electrodeposited Bulk Nanocrystalline Nickel", Master's Thesis, Queen's University, Ontario, Canada, 1993.
Simunovich et al., "Electrochemically Layered Copper-Nickel Nanocomposites with Enhanced Hardness," *J. Electrochem. Soc.* 141(1):L10-L11, 1994.
Sperling et al., "Correlation of stress state and nanohardness via heat treatment of nickel-aluminide multilayer thin films," *J. Mater. Res.* 19(11):3374-3381, 2004.
Srivastava et al., "Corrosion resistance and microstructure of electrodeposited nickel-cobalt alloy coatings," *Surface & Coatings Technology* 201:3051-3060, 2006.
Stephenson, Jr., "Development and Utilization of a High Strength Alloy for Electroforming," *Plating* 53(2): 183-192, 1966.
Suresh, "Graded Materials for Resistance to Contact Deformation and Damage," *Science* 292:2447-2451, 2001.
Switzer et al., "Electrodeposited Ceramic Superlattices," *Science* 247(4941):444-446, 1990.
Tench et al., "Considerations in Electrodeposition of Compositionally Modulated Alloys," *J. Electrochem. Soc.* 137(10):3061-3066, 1990.

(56) References Cited

OTHER PUBLICATIONS

Tench et al., "Enhanced Tensile Strength for Electrodeposited Nickel-Copper Multilayer Composites," *Metallurgical Transactions A* (15A):2039-2040, 1984.

Thangaraj et al., "Corrosion behavior of composition modulated multilayer Zn—Co electrodeposits produced using a single-bath technique," *J. of Appl. Electrochem.* 39:339-345, 2009.

Thangaraj et al., "Surface Modification by Compositionally Modulated Multilayered Zn—Fe Coatings," *Chinese Journal of Chemistry* 26:2285-2291, 2008.

Tokarz et al., "Preparation, structural and mechanical properties of electrodeposited Co/Cu multilayers," *Phys. Stat. Sol.i* 5(11):3526-3529, 2008.

Touchstone Research Laboratory, Ltd., Material Safety Data Sheet, CFOAM Carbon Foams, 2008. (4 pages).

Vill et al., "Mechanical Properties of Tough Multiscalar Microlaminates," *Acta metall. mater.* 43(2):427-437, 1995.

Voevodin et al., "Superhard, functionally gradient, nanolayered and nanocomposite diamond-like carbon coatings for wear protection," *Diamond and Related Materials* 7:463-467, 1998.

Wearmouth et al., "Electroforming with Heat-Resistant, Sulfur-Hardened Nickel," *Plating and Surface Finishing* 66(10):53-57, 1979.

Weil et al., "Pulsed Electrodeposition of Layered Brass Structures," *Metallurgical Transactions A* 19A:1569-1573, 1988.

Weil et al., "Properties of Composite Electrodeposits," U.S. Army Research Office, Final Report, Contract No. DAAL03-87-K-0047, U.S. Army Research Office, 21 pages, 1990.

Wikipedia, "Gold," URL=http://en.wikipedia.org/wiki/Gold, version modified Nov. 3, 12 pages, 2008.

Wikipedia, "Silver," URL=http://en.wikipedia.org/wiki/Silver, version modified Nov. 3, 12 pages, 2008.

Wilcox, "Surface Modification With Compositionally Modulated Multilayer Coatings," The Journal of Corrosion Science and Engineering 6(Paper 52), 2004.

Wu et al., "Preparation and characterization of superhard $CN_x$/ZrN multilayers," *J. Vac. Sci. Technol. A* 15(3):946-950, 1997.

Yahalom et al., "Formation of composition-modulated alloys by electrodeposition," *Journal of Materials Science* 22:499-503, 1987.

Yang et al., "Effects of SiC sub-layer on mechanical properties of Tyranno-SA/SiC composites with multiple interlayers," *Ceramics International* 31:525-531, 2005.

Yang et al., "Enhanced elastic modulus in composition-modulated gold-nickel and copper-palladium foils," *Journal of Applied Physics* 48(3):876-879, 1977.

Yogesha et al., "Optimization of deposition conditions for development of high corrosion resistant Zn—Fe multilayer coatings," *Journal of Materials Processing Technology* 211:1409-1415, 2011.

Zabludovsky et al., "The Obtaining of Cobalt Multilayers by Programme-controlled Pulse Current," Transactions of the Institute of Metal Finishing 75(5):203-204, 1997.

Kruth et al., "Progress in Additive Manufacturing and Rapid Prototyping" *CIRP Annals* 47(2):525-540, 1998.

U.S. Appl. No. 16/671,104, filed Oct. 31, 2019.
U.S. Appl. No. 16/582,931, filed Sep. 25, 2019.
U.S. Appl. No. 16/726,079, filed Dec. 23, 2019.
U.S. Appl. No. 16/346,843, filed May 1, 2019.

\* cited by examiner

ELECTRODEPOSITED COMPOSITIONS AND NANOLAMINATED ALLOYS FOR ARTICLES PREPARED BY ADDITIVE MANUFACTURING PROCESSES

CROSS-REFERENCE TO RELATED APPLICATIONS

This application is a continuation of International Application No. PCT/US2014/030592, filed Mar. 17, 2014, which claims the benefit of U.S. provisional application No. 61/798,559, filed Mar. 15, 2013, each of which applications is incorporated herein by reference in its entirety.

FIELD

Included within this disclosure are articles comprising nanolaminate metal coatings and methods of making them.

SUMMARY

Embodiments of the present disclosure provide methods for the production of articles. Such methods comprise at least two steps. The first involves forming a preform by additive manufacturing such as a three-dimensional (3D) printing. The preforms are then subjected to electrochemical processes that provide a nanolaminate metal coating that possesses desirable chemical, physical, and/or mechanical properties.

Embodiments of the methods described herein thus enable the production of articles that are lightweight relative to similar articles fabricated entirely out of a material such as metal, ceramic or a composite, and which can be readily designed to meet specific requirements for a range of applications including commercial and defense applications. Embodiments of the processes described herein may also be used on various scales and are suited for both low and high rate production. Embodiments of the present disclosure thus provide a method for the production of parts having chemical, physical and/or mechanical properties that permit their use in applications where metal, ceramic and/or composite parts have typically been used.

DETAILED DESCRIPTION

1.0 Definitions

"Additive manufacturing" means the preparation of three-dimensional articles by the sequential addition of materials. The process includes all forms of direct digital manufacturing, including but not limited to traditional three-dimensional printing (3D-printing), selective laser deposition (SLS) or sintering laser melting (SLM), fused deposition modeling (FDM), and stereolithography (SLA).

"Direct digital manufacturing," "Rapid prototyped" or "rapid prototyping" means the additive manufacturing or 3D printing process of making a three-dimensional solid article of any shape from a digital model. The process is an additive one, where successive layers, ribbons beads or areas of material are laid down in different shapes to form a three dimensional article.

"Selective laser sintering" (SLS) refers a process where a bed of powder is locally bonded by the action of a laser to form one cross-section of an article at a time.

"Fused Deposition Modeling" (FDM) refers to a process where molten material (e.g., thermoplastic) is used to form an article of a desired shape.

"Stereolithography" (SLA) refers to a process where a liquid polymer is locally solidified by photo-initiated cross-linking. In the process, light is focused onto the surface of a container of uncured photopolymer, and the desired 2D cross-sectional shape is 'drawn', producing a solidified 2D pattern. Repeating this process produces 3D geometries of the desired shape.

"Laminated Object Manufacturing" (LOM) means the use of thin layers cut to shape and joined together (e.g. paper, polymer, metal) to form a desired three-dimensional article.

Electroless plating means autocatalytic plating in which the plating bath contains reducing agents ready to react with the substrate, and the catalyst is the metal to be deposited or metal on the surface of an article placed in the plating bath.

"Preform" means an object or article possessing a shape such that, after applying a given thickness of laminated material, yields a part with the desired shape and properties.

Where compositions or amounts are given as percentages herein, the composition is given on a weight basis unless stated otherwise.

2.0 Description

2.1 Overview

In embodiments of the processes described herein, nanolaminated metal materials can be applied in a conformal manner to all or part of a perform, thereby imparting desirable chemical, physical, and mechanical (structural) properties to the preformed part, with a minimal increase in mass, especially as compared to the same type of article made from solid metal or ceramic. Such embodiments enable production processes to go from raw material to end product in a single production line. Moreover, embodiments described herein may permit entirely automated production lines and preparation of discrete parts without the preparation of intermediate castings or forming of sheet metal materials. Additionally, material can be placed only where needed, thereby further reducing material consumption in the process and reducing the overall weight of the article.

2.2 Methods of Preform Preparation and the Composition of Preforms

The processes described herein may employ preforms prepared from a variety of materials, including metals, ceramics, and polymers (plastics). The preparation of preforms may be accomplished by any additive manufacturing process including, but not limited to, direct digital deposition, three-dimensional printing (3D-printing), selective laser deposition (SLS) and/or selective laser melting (SLM), fused deposition modeling (FDM), and stereolithography.

When preforms are to be prepared out of metal, ceramic, or glass, the additive manufacturing process employed will typically be a form by SLS and/or SLM processes. Such processes can prepare preforms from one or more metals including, but not limited to, steels, stainless steels, titanium, brass, bronze, aluminum, gold, silver, cobalt-chrome, lead, tungsten and alloys of tungsten. Those processes can also be used to prepare preforms out of ceramics such as "green sand" (e.g., a mixture having: from about 75 to about 85% of a sand (silica sand ($SiO_2$), chromite sand ($FeCr_2O$), zircon sand ($ZrSiO_4$), olivine, staurolite); from about 5 to about 11% bentonite, about 2% to about 4% water; 0 to about 1% anthracite and about 3% to about 5% inert or undefined materials).

Where the preforms are to be prepared from polymers (e.g., thermoplastics), processes that include SLS and/or SLM and FDM may be employed.

Preforms of polymer and plastic materials that can be prepared by additive manufacturing processes can be broadly divided into two categories: conductive and non-conductive materials. Where preforms are prepared from non-conductive plastics, at least the portion of surface upon which electrodeposition will occur must be made conductive. This is typically accomplished by applying a layer of metal using electroless plating, although other methods that achieve the desired result may be employed. Where a plastics that used to make a preform is already conductive, the use of electroless plating is optional, but it may be advantageously employed to increase the conductivity of the preform before subjecting it to electrodeposition of a composition comprising a metal.

Accordingly, embodiments of the preform may comprise a nonconductive material such as a polymer or plastic. Such embodiments include a polymer comprising, e.g., polyetherimide (e.g., Ultem™), polyetherketoneketone, nylon (e.g., Nylon 618), polyvinyl alcohol (PVA), acrylonitrile butadiene styrene (ABS), polycarbonate (PC), polylactic acid (PLA), PC/ABS, a polymer and wood fiber (e.g., LAYWOO-D3™), polyphenylsulfone (PPSU), or a combination of one or more, two or more, or three or more of the foregoing. In other embodiments, the polymer is, e.g., a polyetherimide, polyetherketoneketone, nylon, acrylonitrile butadiene styrene, polycarbonate, polylactic acid, PC/ABS, polyphenylsulfone, or a combination of one or more, two or more, or three or more of the foregoing.

In other embodiments the preform comprises a conductive material. In such embodiments the conductive material may comprises one or more metals selected from the group consisting of Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr. In other embodiments, the conductive material used to form the preform may comprise an alloy including but not limited to, e.g., steels, stainless steels, brass, bronze, nickel-cobalt, nickel-chromium, nickel-iron, zinc-iron, cobalt-chrome, tin based pewters, and alloys of tungsten.

In other embodiments, conductive preforms may comprise a conductive or non-conductive polymer and one or more metals or non-metallic conductive materials added to the polymers (e.g., before or after curing) that render the composition conductive or more conductive. Examples of conductive, non-metallic materials that can be added to polymers to increase conductivity are carbon black, graphene, graphite, carbon nanotubes, carbon nanofibers, or graphite fibers, which can be added to the polymers alone or in combination with conductive metallic materials.

A variety of conductive polymeric materials can be used to prepare preforms that are conductive, including but not limited to polymers comprising polyaniline or polypyrrole.

2.3 Preform Structure

Preforms prepared by additive manufacturing may comprise complex shapes and geometries. In embodiments, the preforms comprise at least one section that includes a "honeycomb" network, e.g., of hexagonal prisms, pentagonal prisms, cubes, or triangular prisms (e.g., a sheet comprising a honeycomb of hollow hexagonal prisms). In other embodiments, all or a portion of the preform may be foam-like with pores that are discrete and/or fairly continuous throughout the foam-like portion of the perform.

In other embodiments, at least a portion of the preform comprises a series of struts that extend in an essentially linear fashion between the vertices of polyhedral structures that are substantially tetrahedral, icosahedral, dodecahedral, octahedral or cubic that make up part of the preform. The struts may be substantially cylindrical (i.e., substantially circular in a plane perpendicular to the two vertices the struts connect. The struts may also be substantially triangular, square, pentagonal, hexagonal, heptagonal, or octagonal in a plane perpendicular to the two vertices the struts connect. Such struts may have width in a plane perpendicular to that that of the vertices the struts connect from about 0.2 to about 1.0 mm, from about 1 mm to about 1 cm, from about 5 mm to about 2 cm or from about 1 cm to about 5 cm. Other sizes may be employed depending on the size and shape of the structure.

In some embodiments it may be desirable to introduce parts into preforms that assist in manufacturing but that are not intended to be included in the final article to be prepared. Accordingly, where it is necessary or desirable to introduce parts necessary or desirable for manufacturing, but not required in the final article, such as tabs or wires for racking and electroplating, they can be located in non-structural portions of the article.

Additionally, the preform geometry can be defined such that, after electrodeposition of a nanolaminate, the resulting part is of the desired end-geometry. For instance, preforms lacking sharp corners (convex or concave) will be less likely to affect highly non-uniform current distributions. Similarly, the preform itself could contain portions that are designed solely to influence distribution of current, which portions are designed to be removed once part fabrication is complete. Such portions could serve as either shields (nonconductive current-blockers) or thieves (conductive current-stealers). Additionally, preform elements could be designed to convey electrolyte to the surface of the structure such that both mass transfer and current distribution over the structure's surface are controlled by non-structure portions of the preform.

In addition to their structure, the preforms may have a roughness (usually expressed as an "Ra" value) as well as micropores. The presence of surface roughness and micropores may be advantageous for binding between the electrodeposited composition(s) (e.g., a nanolaminate coating) and the preform. Particularly where the preforms are comprised of a polymer, pores and surface roughness may be introduced into the polymer surface prior to the deposition of any metal-containing composition by either an electroless process or by electrodeposition.

The presence of micropores and the surface roughness of materials may be changed by a variety of techniques, including chemical and or physical processes. In some embodiments, preforms may be subjected to chemical etching (e.g., exposure to chromic acid) to modify the surface prior to the deposition of any metal-containing composition on the preform.

FDM deposited polymers may be prepared with a higher porosity and/or surface area than the same material prepared by injection molding, leading to high bond strengths between the coating and the preform. The higher porosity and/or surface area inherent in the structure of FDM processed polymers results from their manufacture. Structures prepared by FDM process have an ordered structure of polymeric beads or threads, which are formed in that manner by the FDM machine. These beads result in small voids which, although enhancing the surface area and permitting higher binding between the preform and the coatings applied to the preform, can also entrap fluids and contaminants from chemical processes (e.g., electroless plating). The use of ultrasonic agitation provides a new method of removing chemicals and fluids from the structure of the FDM part.

Traditional rinsing and agitation during electroless metallization processes fail to adequately remove all chemicals and fluids from the structure of FDM parts.

3.0 Electrodeposited Compositions and Nanolaminate Coatings and Process for Their Application 3.1 The Use of Electroless Plating to Render Preforms Suitably Conductive In order to electrodeposit a composition comprising a metal on at least a portion of a preform's surfaces that are accessible to liquids, those surfaces must be conductive and brought in contact with a bath containing salts of the metals to be electrodeposited. To make the surfaces of non-conductive preforms conductive typically requires subjecting the surface to electroless plating of a metal such as nickel, cadmium, gold, silver, rhodium, chrome, zinc, tin, or copper. In embodiments, the metal applied to the preform by electroless deposition is nickel.

Preparation of preforms for electroless plating, particularly of non-conductive plastics/polymer preforms, generally includes a step of etching the surface of the preform. Etching is typically accomplished by using a strong oxidizing agent to create microscopic pores or holes in the surface of the plastic. The pores or holes increase the surface area and improve adhesion of subsequently applied metal layers. Some strong oxidizing solutions/suspensions used as etchants include peroxides (e.g., hydrogen peroxide), persulfates, chromic acid, acidic or basic permanganate solutions, chromium trioxide solutions or suspensions, and sulfuric acid. In embodiments, the preform comprises ABS and the etchant is chromic acid or chromium trioxide containing solution/suspension.

Following etching, at least a portion of the etched section of the preform may be contacted with a composition that deposits a metallic catalyst on the etched surface of the polymer preform. The catalyst is typically palladium, which can be applied using tin as a reducing agent (e.g., $Sn^{+2}+Pd^+{}_2=Sn^{+4}Pd^0$), however, other catalysts including noble metal catalysts may be used (e.g., platinum, rhodium, iridium, nickel, copper, silver, gold). Upon contact with the electroless plating bath, the catalyst causes a layer of metal to form on the surface of the polymeric preform exposed to the catalyst and then the bath.

While preforms may comprise a solid mass of conductive or nonconductive materials, they may also be comprised of a series of voids or pores. The voids or pores may be in fluid contact with the surface of the preform and permit access to electrolytes used in electroless plating and other procedures such as rinsing. Liquids trapped in those voids, or chemical residues from those liquids may interfere with subsequent electrodeposition of coatings or become trapped in the finished part by subsequent electrodeposition.

Prior to electrodeposition of metal onto the surface of the preform, it is necessary to remove any of the residual electroless plating materials from the preform so that they do not interfere with the plating or become trapped in the preform. Removal of the electroless bath components may be effected, e.g., by submersing the component in a bath or shower of cleaning solution (e.g., water) while exposing the preform to sonication. The sonication may employ sound energy at any frequency and amplitude that is effective. In some embodiments the frequency employed is from about 18-25 kHz, and in other embodiments the frequency is about 20-23 kHz. In some embodiments, the sonication is performed in a bath with a continuous flow of cleaning liquid into the bath.

In some embodiments, contacting an electroless plated preform with a bath or shower of liquid while being subjected to sonication removes greater than about 70%, 80%, 90%, 92%, 94%, 96%, 98% or 99% by weight of the electroless plating solution that remained associated with said electroless plated preform following its removal from the electroless plating solution.

In other embodiments, contacting an electroless plated preform with a bath or shower of liquid while being subjected to sonication removes greater than about 70%, 80%, 90%, 92%, 94%, 96%, 98% or 99% by weight of a component present in the electroless plating solution that remained associated with the electroless plated preform following its removal from the electroless plating solution.

Prior to electrodeposition of a metal composition (e.g., a nanolaminate coating), it may be advantageous to remove liquids and or volatile components associated with the preforms. Removal of liquids or volatile components from preforms, including those from the electroless plating process or from bathing or showering the preform following electroless plating, may be accomplished, e.g., by subjecting the preform to a reduced pressure (vacuum). In embodiments, an electroless plated preform is subjected to a reduced gas pressure that is less than 760 mm of mercury (1 atmosphere). In other embodiments, the preforms are subject to a pressure that is less than 500, 400, 300, 200, 100, 50, 20, 10, 5, 2, 1, 0.5, 0.2, 0.1, 0.05, 0.02, 0.01 mm of Hg. By exposing the preform to reduced gas pressure, greater than about 50%, 60%, 70%, 80%, 90%, 92%, 94%, 96%, 98% or 99% (by weight) of the liquids associated with said electroless plated preform can be removed.

Where electroless plating has been used with a preform and/or where a preform has been subject to cleaning by exposure to a liquid, it may be desirable to place small holes (e.g. pinholes or orifices) in portions of the preform so that electroless plating and/or cleaning solutions can be removed from the preforms. The small holes or apertures can be included in the preforms at non-structural, low stress, and/or visually discrete locations (e.g., out of the line of sight from the surface). Using holes formed in those locations permits the removal of both electroless plating compositions and liquids used during cleaning by ultrasonic cleaning and/or vacuum treatment described herein. The removal of those materials improves the quality of the subsequent electrodeposition processes (e.g., improving the adherence of the electrodeposited coating) and avoids the production of articles that are potentially contaminated or compromised by the presence of trapped liquids that may cause or contribute to deterioration of the article.

3.2 Electrodeposited Compositions and Nanolaminate Coatings

Metals, polymers, and semiconductors can all be electroplated (electrodeposited), and in most cases the required conditions are at or near ambient temperature and pressure. Embodiments of the processes described herein include methods of electrodepositing a composition comprising a metal on a preform prepared by additive manufacturing, where the process comprises:

optionally subjecting all or part of the preform to electroless plating;

providing a bath including at least one electrodepositable component;

contacting all or part of the preform with the bath;

applying voltage or current to the preform to deposit at least one electrodepositable component comprising a metal.

In some embodiments, the bath comprises at least two, at least three, or at least four electrodepositable components. The electrodepositable components include metal salts, from which metals may be electroplated onto the preform, and where the bath comprises more than one metal salt as an electrodepositable component, alloys of varying composition may be electrodeposited on the preform depending on the current and voltage applied.

In some embodiments, the method of electrodepositing comprises applying a time varying current density, wherein the time varying current density oscillates at least for two cycles to deposit a structurally and/or compositionally modulated material on the preform. The structural and or compositionally modulated materials may be applied such that they have a discrete interface, or a diffuse interface where the composition changes from a first composition to a second composition over a distance from about 3 nm to about 8 nm, about 5 nm to about 10 nm, about 7 nm to about 15 nm, or about 10 nm to about 20 nm. In other embodiments, a discrete interface between two layers may be considered as one in which the composition shifts between the compositions of the first layer and the second layer over a distance that is less than about 20%, about 15%, about 10%, about 8%, about 5%, about 4% or about 2% of the thickness of the thinner of the first and second layers. In other embodiments layers have diffuse interfaces where the compositions vary from that of a first composition to a second composition in a continuous manner. In some embodiments, the diffuse interface vary between the compositions of the first and second layer over a distance that is greater than about 20%, about 25%, about 30%, about 35%, about 40%, about 45% and less than or equal to 50% of the thickness of the thinner of the first and second layers.

The composition comprising a metal that is electrodeposited onto the preform may vary in its constituent metals. In some embodiments, the composition comprises one or more, two or more, three or more, or four or more different metals independently selected from Ag, Al, Au, Be, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr, wherein each of said independently selected metals is present at greater than 0.1, 0.05, 0.01, 0.005 or 0.001% by weight.

In other embodiments, the composition electrodeposited onto the preform comprises two or more or three or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at more than 0.1, 0.05, 0.01, 0.005, or 0.001% by weight. In such embodiments, compositions of two or more different metals that can be electrodeposited comprise, for example, Zn and Fe, Zn and Ni, Co and Ni, Ni and Fe, Ni and Cr, Ni and Al, Cu and Zn, or Cu and Sn.

In some embodiments, the composition electrodeposited onto the preform comprises a structurally and/or compositionally modulated electrodeposited material or composition. The structurally and/or compositionally modulated composition may comprise at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm, about 10 nm and about 250 nm.

In other embodiments, the structurally and/or compositionally modulated material has at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

As described above, where the electrodeposited material comprises two or more structurally and/or compositionally different layers, the layers may have a discrete or diffuse interfaces.

In embodiments where the electrodeposited material comprises two or more structurally and/or compositionally different layers, the composition may comprise a plurality of alternating first layers and second layers. The coating of electrodeposited material may consist entirely of the alternating first and second layers, which may have discrete or diffuse interfaces between the layers. Alternatively, one or more additional layers may be present in the coating between any first and second layer.

In embodiments where the electrodeposited composition applied to all or part of the preform comprises a plurality of layers (e.g., first layers and second layers or alternating first and second layers), the electrodeposited composition applied to the preform (e.g., as a conformal coating or partial coating) may comprise two or more, three or more, four or more, six or more, eight or more, ten or more, twenty or more, forty or more, fifty or more, 100 or more, 200 or more, 500 or more, 1,000 or more, 1,500 or more, or 2,000 or more alternating first and second layers independently selected for each multilayer coating.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises cobalt and/or chromium. In such embodiments, each second layer comprises chromium and/or cobalt in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises aluminum. In such embodiments, each second layer comprises aluminum in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-

70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises aluminum and/or cobalt. In such embodiments, each second layer comprises aluminum and/or cobalt in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises iron. In such embodiments, each second layer comprises iron in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise zinc in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises iron. In such embodiments, each second layer comprises iron in a range independently selected from 1%-35%, 1%-3%, 2%-5%, 5%-10%, 10%-15%, 15%-20%, 20%-25%, 25%-30%, or 30%-35%, the balance of which comprises zinc.

In some embodiments where a plurality of first and second layers are present, the first layers each comprise copper in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises zinc and/or tin. In such embodiments, each second layer comprises zinc and/or tin in a range independently selected from 1%-35%, 1%-3%, 2%-5%, 5%-10%, 10%-15%, 15%-20%, 20%-25%, 25%-30%, or 30%-35%, the balance of which comprises copper.

In some embodiments where the components of the above-mentioned electrodeposited compositions are not completely defined (that is, less than 100% of the components by weight are defined and/or required), then the balance of those layers may comprise one or more different elements. That is particularly so in embodiments of the above-mentioned binary or ternary alloy compositions comprising a plurality of layers (e.g., of first and second layers). Thus, in some embodiments, the electrodeposited compositions may comprise one or more elements selected from the group consisting of Ag, Al, Au, Be, C, Cr, Cu, Fe, Hg, In, Ir, Mg, Mn, Mo, Nb, Nd, Pd, Pt, Re, Rh, Sb, Si, Sn, Pb, Ta, Ti, W, V, Zn and Zr. In other embodiments, where the electrodeposited composition comprises one or more of said first and/or second layers, the layers may each comprise one or more, two or more, three or more, or four or more elements selected independently for each first and second layer from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn and Zr.

4.0 Properties of Electrodeposited Coatings and Preformed Parts

Electrodeposited alloys applied to preforms (e.g., nanolaminate coatings) can be fully or substantially fully dense, having a limited number of pores or cracks, making them useful as corrosion resistant coatings, in addition to their role as a structural component of finished parts or articles.

In embodiments where the electroplated compositions are comprised of a plurality of layers less than about 20 nm (e.g., about 15 nm, 10 nm, 8 nm, or 5 nm), the compositions display increased "Hall-Petch" hardness/toughness and strength. The observed increases in hardness results from grain confinement and increased toughness results from force reflection in the laminate regions. Such coatings tend to follow the Hall-Petch relationship, which traditionally is used to describe the increase in yield strength observed in nanocrystalline materials.

In embodiments where the electroplated compositions are comprised of a plurality of layers of hard and soft materials laminated together, the electrodeposited composition may display Koehler toughening. That form of toughening results from a deflection of a nascent crack at the layer interface due to differing modulus. Such articles can thus absorb the energy that typically causes cracking and thereby prevent or substantially diminish bulk material failure, and/or prolong the time to such bulk material failure.

In addition to mechanical and physical enhancement of preform properties, compositions electrodeposited onto preforms also can alter the preforms' chemical attributes. In some embodiments, at least a portion of the composition electrodeposited onto a preform is chemically resistant to the environment and protects the underlying preform (e.g., the metal coating protects the preform from solvents or UV (ultraviolet) light that may damage the preform). In other embodiments, at least a portion of the composition electrodeposited on the preform is more noble than the underlying preform and acts as a barrier coating in corrosive environments that can damage the underlying preform. In yet other embodiments, at least a portion of the composition electrodeposited on the preform is less noble than the preform and sacrifices itself in corrosive environments to protect the preform.

5.0 Certain Embodiments

1. A method of preparing an article comprising:
   preparing a preform by additive manufacturing;
   optionally subjecting all or part of the preform to electroless plating; and
   electrodepositing a composition comprising a metal to the preform.
2. The method of embodiment 1, wherein said preform comprises a nonconductive material.
3. The method of embodiment 2, wherein the nonconductive material is a polymer.
4. The method of embodiment 3, wherein the polymer comprises: polyetherimide (e.g., Ultem™), polyetherketoneketone, nylon (e.g., Nylon 618), polyvinyl alcohol (PVA), acrylonitrile butadiene styrene (ABS), polycarbonate (PC), polylactic acid (PLA), PC/ABS, wood fiber (e.g., LAYWOO-D3), polyphenylsulfone (PPSU) or a combination of one or more, two or more, or three or more of the foregoing.
5. The method of embodiment 4 wherein the polymer is a polyetherimide, polyetherketoneketone, nylon, acrylonitrile butadiene styrene (ABS), polycarbonate (PC), polylactic acid (PLA), PC/ABS, polyphenylsulfone (PPSU), or a combination of one or more, two or more, or three or more of the foregoing.

6. The method of embodiment 2, wherein said preform comprises a conductive material.

7. The method of embodiment 6 wherein said conductive material comprises one or more metals, a non-conductive polymer and one or more metals, and/or a conductive polymer and one or more metals.

8. The method of embodiment 7, wherein said one or metals comprise one or more metals selected from the group consisting of: Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr.

9. The method of any of embodiments 6-8, wherein said conductive material comprises a conductive polymer, a non-conductive polymer and a conductive non-metallic material, and/or a conductive polymer and a conductive non-metallic material.

10. The method of embodiment 9, wherein said conductive polymer comprises polyaniline or polypyrrole.

11. The method of embodiment 9 or 10, wherein said conductive non-metallic material comprises carbon black, grapheme, graphite, carbon nanotubes, carbon nanofibers, or graphite fibers.

12. The method of any of embodiments 1-11, wherein all or part of said preform is contacted with an electroless plating solution to produce an electroless plated preform prior to said electrodepositing, followed by removal of said electroless plated preform from contact with said electroless plating solution.

13. The method of embodiment 12, further comprising contacting said electroless plated preform with a bath or shower of liquid while being subjected to sonication.

14. The method of embodiment 13, wherein contacting said electroless plated preform with a bath or shower of liquid while being subjected to sonication removes greater than about 70%, 80%, 90%, 92%, 94%, 96%, 98% or 99% by weight of the electroless plating solution associated with said electroless plated preform following said removal of said electroless plated preform from contact with said electroless plating solution.

15. The method of embodiment 13, wherein contacting said electroless plated preform with a bath or shower of liquid while being subjected to sonication removes greater than about 70%, 80%, 90%, 92%, 94%, 96%, 98% or 99% by weight of a component present in the electroless plating solution that was associated with said electroless plated preform following said removal of said electroless plated preform from contact with said electroless plating solution.

16. The method of any of embodiments 12-15, wherein prior to said electrodepositing, said electroless plated preform is subjected to a reduced gas pressure that is less than 760 (1 atmosphere), 100, 50, 20, 10, 5, 2, 1, 0.5, 0.2, 0.1, 0.05, 0.02, 0.01 mm of Hg.

17. The method of embodiment 16, wherein said electroless plated preform is subjected to said reduced gas pressure for a period to remove greater than about 50%, 60%, 70%, 80%, 90%, 92%, 94%, 96%, 98% or 99% of any liquid, by weight, associated with said electroless plated preform prior to its being subjected to said reduced pressure.

18. The method of any of embodiments 1-17, wherein said preform is prepared by a process comprising direct digital manufacturing or additive manufacturing, (e.g., FDM, SLS, SLA or LOM).

19. The method of any of embodiments 1-18, wherein electrodepositing a composition comprising a metal comprises:

providing a bath including at least one electrodepositable component;

contacting all or part of the preform with the bath; and applying voltage or current to the preform to deposit at least one electrodepositable component comprising a metal.

20. The method according to embodiment 19, comprising providing a bath including at least two, at least three, or at least four electrodepositable components.

21. The method of embodiment 19 or embodiment 20, further comprising applying a time varying current density wherein the time varying current density oscillates at least for two cycles to deposit a structurally and/or compositionally modulated material on said preform.

22. The method of any of embodiments 1-21, wherein electrodepositing a composition comprising a metal comprises the electrodeposition of a composition comprising one or more, two or more, three or more, or four or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at greater than 0.1, 0.05, 0.01, 0.005 or 0.001% by weight.

23. The method of any of embodiments 1-21, wherein electrodepositing a composition comprising a metal comprises the electrodeposition of a composition comprising two or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at greater than 0.01% by weight.

24. The method of embodiment 23, wherein said two or more different metals comprise Zn and Fe, Zn and Ni, Co and Ni, Ni and Fe, Ni and Cr, Cu and Zn, or Cu and Sn.

25. The method according to any of embodiments 21-24, wherein the structurally and/or compositionally modulated material comprises at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm, about 10 nm and about 250 nm.

26. The method according to any of embodiments 21-24, wherein the structurally and/or compositionally modulated material comprises at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

27. The method of any of embodiments 1-26, wherein said composition comprising a metal comprises a plurality of first layers and second layers, which may have discrete or diffuse interfaces between the first and second layers, and which may be arranged as alternating first and second layers.

28. The method of embodiment 27, wherein said plurality of alternating first layers and second layers comprises two or more, three or more, four or more, six or more, eight or more, ten or more, twenty or more, forty or more, fifty or more, 100 or more, 200 or more, 500 or more, 1,000 or more, 1,500 or more, or 2,000 or more alternating first and second layers independently selected for each coating.

29. The method of any of embodiments 27-28, wherein each said first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65% 65%-70%, 70%-75%, 75%-80%, 80%-85%, 85%-90%, 90%-92% 92%-93%, 93%-94%, 94%-95%, 95%-96%, 96%-97%, 97%-98% or 98%-99%.

30. The method of any of embodiments 27-29, wherein each second layer comprises cobalt and/or chromium in a range independently selected from 1%-35%, 1%-3%, 2%-5%, 5%-10%, 10%-15%, 15%-20%, 20%-25%, 25%-30%, or 30%-35%.

31. The method of embodiment 29 or 30, wherein each said first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99% and the balance of the layer comprises cobalt and/or chromium.

32. The method of embodiment 30 or 31, wherein each second layer comprises cobalt and/or chromium in a range selected independently from 1%-35%, 1%-3%, 2%-5%, 5%-10%, 10%-15%, 15%-20%, 20%-25%, 25%-30%, or 30%-35% and the balance of the layer comprises nickel.

33. The method of any of embodiments 27-32, wherein one or more of said first and/or second layers comprises one or more, two or more, three or more, or four or more elements selected independently for each first and second layer from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn and Zr.

34. The method of any of embodiments 27-33, wherein each said first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65% 65%-70%, 70%-75%, 75%-80%, 80%-85%, 85%-90%, 90%-92% 92%-93%, 93%-94%, 94%-95%, 95%-96%, 96%-97%, 97%-98% or 98%-99% and the balance of the layer comprises iron.

35. The method of any of embodiments 27-34, wherein each second layer comprises iron in a range independently selected from 1%-35%, 1%-3%, 2%-5%, 5%-10%, 10%-15%, 15%-20%, 20%-25%, 25%-30%, or 30%-35% and the balance of the layer comprises nickel.

36. An article produced by the method of any of embodiments 1-35.

37. The article of embodiment 36, wherein said article has a property selected from the group consisting of hardness and/or toughness that is greater than that of said preform.

38. The article of embodiment 36 wherein said electrodeposited composition is comprised of NiCo and has a microhardness of about 400 to about 500 Vickers units measured according to ASTM (American Society for Testing and Materials) E384-11e1.

39. The article of embodiment 36 wherein said electrodeposited composition is comprised of nickel and chromium and has a microhardness of about 500 to about 600 Vickers units measured according to ASTM E384-11e1.

40. The article of embodiment 36 wherein said electrodeposited composition comprises a plurality of layers and displays Hall-Petch hardening relative to a homogeneous electrodeposited composition having the average composition and substantially the same thickness of the plurality of layers.

41. The article of embodiment 36 or 40, wherein said electrodeposited composition comprises a plurality of layers and displays Hall-Petch strengthening relative to a homogeneous electrodeposited composition having the average composition and substantially the same thickness of the plurality of layers.

42. The article of embodiment 36, wherein said electrodeposited composition comprises a plurality of layers and displays Koehler toughening relative to a homogeneous electrodeposited composition having the average composition and substantially the same thickness of the plurality of layers.

6.0 EXAMPLES

Example 1

Additive Manufacturing of Nanolaminated Nickel-Iron Plated Wrenches

Wrenches were prepared from ABS preforms prepared using FDM. Wrenches were prepared at two different FDM printing densities with a first set of wrenches having smaller beads deposited in the FDM process than the second set. The preforms were chromate etched and subjected to electroless nickel plating to render the preforms conductive. A 100 micron coating of nanolaminated Ni—Fe having alternating layers of 70% Ni-30% Fe and 90% Ni-10% Fe (about 100 nm each) was electrodeposited. The coated articles produced by this process had a bright finish that appeared self-leveling, and which appeared to adhere well. The wrenches with the larger bead structure in the printed preform were larger and more rigid, but the larger bead prevented effective infiltration of the plastic preform.

Example 2

Additive Manufacturing of Nanolaminated Nickel-Iron Plated Wrenches and Complex Parts Wrenches, an unmanned aerial vehicle propeller and wing, a honeycomb speaker cover, corrugated articles and plastic structures with "teeth", and small air ducts from airplanes were prepared from ABS preforms prepared using FDM. A preform in the shape of a plastic dome with an internal truss structure was prepared from Ultem™. The preforms were chromate etched and subjected to electroless nickel plating to render them conductive. A 100 micron coating of nanolaminated Ni—Fe having alternating layers of 70% Ni-30% Fe and 90% Ni-10% Fe (about 100 nm each) was electrodeposited. The coated articles produced by this process had a bright finish that appeared self-leveling, and which appeared to adhere well. The wrenches with the larger bead structure in the printed preform were larger and more rigid, but the larger bead prevented effective infiltration of the plastic preform. These articles demonstrate the complexity of parts that can be prepared and the efficient coverage and adhesion of the nanolaminate coatings to the preforms. The dome and the wing and propeller show coating uniformity over complex surfaces.

Example 3

Additive Manufacturing of Nanolaminated Nickel-Iron Plated Wrenches

Two styles of wrenches were produced from ABS preforms prepared using FDM. The preforms were chromate etched and subjected to electroless nickel plating to render the preforms conductive. A target thickness of 100 microns of nanolaminated Ni—Fe coating having alternating layers of 70% Ni-30% Fe and 90% Ni-10% Fe (about 100 nm each) was electrodeposited. As in Example 1, the coated articles produced by this process had a bright finish that appeared self-leveling, and which appeared to adhere well. The wrenches with the larger bead structure in the printed preform were larger and more rigid, but the larger bead prevented effective infiltration of the plastic preform.

Both wrench styles were tested for their ability to withstand torque relative to unplated ABS preforms. Both wrenches plated with the nanolaminate Ni—Fe coatings resulted in lower breaking points than the uncoated plastic preforms. This lower breaking point was attributed to the electroless-nickel process embrittling the plastic, a failure to achieve a full coating thickness, and other factors including a failure of the metal to infiltrate the "weave" of the ABS preform.

Example 4

Additive Manufacturing of Nanolaminated Nickel-Iron Plated Truss and Honeycomb Structures Stereolithography was used to prepare rapid prototype honeycomb and preform structures from a combination of nylon 11 and nylon 12 with and without added graphite. Both the graphite containing and graphite free preforms were chromate etched and subjected to electroless nickel plating to render the preforms conductive. A 100 micron coating of nanolaminated Ni—Fe coating having alternating layers of 70% Ni-30% Fe and 90% Ni-10% Fe (about 100 nm each) was electrodeposited. The preparation of these articles demonstrates that preforms suitable for electrodeposition of nanolaminate alloys may be prepared by stereolithography. The truss structure also demonstrates that localized strength and tensile properties can be designed or added into parts with minimal surface area sacrificed. The use of rapid preform preparation in the process allows for a responsive adjustment to the need for improved part performance based on testing results without requiring complete redesign and reforming of plastic substrate.

Example 5

Additive Manufacturing of Nanolaminated Nickel-Iron Plated I-Beam

Stereolithography was used to prepare a preform for an I-beam support and the wiring run supports from graphite filled nylon 12. The preforms were chromate etched and subjected to electroless nickel plating to render the preforms conductive. A 100 micron coating of nanolaminated Ni—Fe with alternating layers of 70% Ni-30% Fe and 90% Ni-10% Fe (about 100 nm each) was electrodeposited. The preparation of these articles demonstrates that stereolithography can be used to prepare preforms.

The invention claimed is:
1. An article comprising:
a polymer preform; and
a material on the preform, the material comprising a plurality of layers comprising alternating first layers and second layers, the first layers being compositionally different from the second layers, each first layer comprising a first alloy of nickel and cobalt, the first alloy comprising nickel in a concentration of at least 1% and cobalt in a concentration of at least 1%, by weight, each second layer comprising a second alloy of nickel and cobalt, the second alloy comprising nickel in a concentration of at least 1% and cobalt in a concentration of at least 1%, by weight.

2. The article of claim 1, wherein the polymer comprises: polyetherimide, polyetherketoneketone, nylon, polyvinyl alcohol (PVA), acrylonitrile butadiene styrene (ABS), polycarbonate (PC), polylactic acid (PLA), PC/ABS, wood fiber, polyphenylsulfone (PPSU), or a combination thereof.

3. The article of claim 1, wherein the polymer preform comprises a conductive material.

4. The article of claim 1, wherein the material is a structurally modulated material.

5. The article of claim 4, wherein the material comprises at least one portion having a plurality of layers with wavelengths ranging from about 1 nm to about 250 nm.

6. The article of claim 1, wherein the article has a property selected from the group consisting of hardness, toughness, or both, that is greater than that of the polymer preform.

7. The article of claim 1, wherein the material has a microhardness ranging from about 400 to about 500 Vickers units measured according to American Society for Testing and Materials (ASTM) E384-11e1.

8. The article of claim 1, wherein the material comprises a plurality of layers and displays Hall-Petch hardening or strengthening relative to a homogeneous electrodeposited composition having the average composition and substantially the same thickness of the plurality of layers.

9. The article of claim 1, wherein a portion of the polymer preform includes a honeycomb network.

10. The article of claim 1, wherein the plurality of layers have discrete interfaces between adjacent layers.

11. The article of claim 1, wherein the plurality of layers have diffuse interfaces between adjacent layers.

12. The article of claim 1, wherein the concentration of cobalt in each second layer ranges from 1% to 35%, by weight.

13. The article of claim 1, further comprising a conductive layer between the polymer preform and the material.

14. A method comprising:
electrodepositing a material on a polymer preform prepared by additive manufacturing, the material comprising a plurality of layers comprising alternating first layers and second layers, the first layers being compositionally different from the second layers, each first layer comprising a first alloy of nickel and cobalt, the first alloy comprising nickel in a concentration of at least 1% and cobalt in a concentration of at least 1%, by weight, each second layer comprising a second alloy of nickel and cobalt, the second alloy comprising nickel in a concentration of at least 1% and cobalt in a concentration of at least 1%, by weight.

15. The method of claim 14, further comprising contacting at least a part of the polymer preform with an electroless plating solution to produce an electroless plated polymer preform prior to the electrodepositing.

16. The method of claim 14, further comprising preparing the polymer preform by additive manufacturing.

17. The method of claim 16, wherein the additive manufacturing comprises direct digital manufacturing.

18. The method of claim 14, wherein electrodepositing the material comprising the metal comprises:
providing a bath including at least one electrodepositable component that comprises the metal;

contacting at least part of the polymer preform with the bath; and applying voltage or current to the polymer preform to deposit the material.

19. The method of claim 14, wherein the electrodepositing comprises applying a time varying current density wherein the time varying current density oscillates for a plurality of cycles to deposit the material on the polymer preform, and wherein the material is a structurally modulated material.

20. The article of claim 1, wherein the concentration of nickel in at least one layer of the plurality of layers ranges from 1% to 35%, by weight.

21. The article of claim 1, wherein the concentration of nickel in each layer of the plurality of layers ranges from 1% to 35%, by weight.

22. The article of claim 1, wherein the plurality of layers further comprises a third layer between one of the first layers and one of the second layers.

23. The method of claim 14, wherein the concentration of nickel in at least one layer of the plurality of layers ranges from 1% to 35%, by weight.

24. The method of claim 14, wherein the concentration of nickel in each layer of the plurality of layers ranges from 1% to 35%, by weight.

25. The method of claim 14, wherein the plurality of layers further comprises a third layer between one of the first layers and one of the second layers.

26. The article of claim 1, wherein the plurality of layers further comprises a third layer between each of the first and the second layers.

27. The method of claim 14, wherein the plurality of layers further comprises a third layer between each of the first and the second layers.

28. The article of claim 1, wherein each of the first layers is compositionally the same and each of the second layers is compositionally the same.

29. The method of claim 14, wherein each of the first layers is compositionally the same and each of the second layers is compositionally the same.

* * * * *